(12) United States Patent
Eickhoff et al.

(10) Patent No.: US 7,670,698 B2
(45) Date of Patent: Mar. 2, 2010

(54) SILICIDE FUELED POWER GENERATORS AND METHODS RELATED THERETO

(75) Inventors: Steven J. Eickhoff, Plymouth, MN (US); David W. Nielsen, Maple Grove, MN (US)

(73) Assignee: Honeywell International Inc, Morristown, NJ (US)

( * ) Notice: Subject to any disclaimer, the term of this patent is extended or adjusted under 35 U.S.C. 154(b) by 216 days.

(21) Appl. No.: 11/726,491

(22) Filed: Mar. 22, 2007

(65) Prior Publication Data

US 2007/0237995 A1    Oct. 11, 2007

Related U.S. Application Data (60) Provisional application No. 60/790,681, filed on Apr. 10, 2006.

(51) Int. Cl.
*H01M 8/06* (2006.01)
(52) U.S. Cl. .................. 429/17; 429/19; 429/30
(58) Field of Classification Search .................. 429/12, 429/17, 19, 30, 18, 34, 38, 40
See application file for complete search history.

(56) References Cited

U.S. PATENT DOCUMENTS

| | | | |
|---|---|---|---|
| 3,669,751 A | * | 6/1972 | Richman ...................... 429/17 |
| 5,401,371 A | * | 3/1995 | Oshima et al. ............... 204/258 |
| 2006/0002839 A1 | * | 1/2006 | Lefenfeld et al. ........... 423/344 |

FOREIGN PATENT DOCUMENTS

| | | |
|---|---|---|
| CH | 0473483 | 5/1969 |
| EP | 1514839 A2 | 3/2005 |
| WO | WO-2005/051839 A2 | 6/2005 |

OTHER PUBLICATIONS

"European Patent Application No. 07105846.5, Communication and Search Report mailed Aug. 27, 2007", 14 pgs.
"European Application Serial No. 07105846.5, Examination Report dated Jun. 13, 2008", 2 pgs.
"European Application Serial No. 07105846.5, Examination Report mailed Jun. 3, 2009", 4 pgs.
"European Application Serial No. 07105846.5, Response filed Nov. 24, 2008 to Examination Report dated Jun. 13, 2008", 11 pgs.

* cited by examiner

*Primary Examiner*—Patrick Ryan
*Assistant Examiner*—Monique Wills
(74) *Attorney, Agent, or Firm*—Kris T. Fredrick (57) ABSTRACT

Embodiments of the present invention relate to a power generator comprising one or more fuel cells and a fuel, wherein the fuel comprises an alkali metal silicide.

15 Claims, 8 Drawing Sheets

SILICIDE FUELED POWER GENERATORS AND METHODS RELATED THERETO

PRIORITY OF INVENTION

This non-provisional application claims the benefit of priority under 35 U.S.C. §119(e) to U.S. Provisional Patent Application Ser. No. 60/790,681 filed Apr. 10, 2006, which is herein incorporated by reference.

FIELD OF THE INVENTION

Embodiments of the present invention related to silicide fueled hydrogen generators and power generators. More specifically, embodiments of the present invention relate to alkali metal silicide fueled generators.

BACKGROUND

Fuel cells, such as PEM fuel cells, use a simple chemical reaction to combine hydrogen and oxygen into water, producing electric current in the process. Traditionally, hydrogen may be produced by a chemical reaction between a fuel, such as lithium aluminum hydride, and water vapor. At an anode, hydrogen molecules are ionized by a platinum catalyst, and give up electrons. The proton exchange membrane (PEM) allows protons to flow through, but not electrons. As a result, hydrogen ions flow through the PEM to a cathode, while electrons flow through an external circuit. As the electrons travel through the external circuit, they can perform useful work by powering an electrical device such as an electric motor, light bulb or electronic circuitry. At the cathode, the electrons and hydrogen ions combine with oxygen to form water. The byproducts of the reaction are water and heat.

Fuels currently used in power generators, such as metal hydrides, have poor energy density. Pure alkali metals used as a fuel may theoretically improve the energy density of the fuel, but are pyrophoric and difficult to handle and store. Traditional fuels require high volume and/or high maintenance storage vessels which may also be a safety concern in many applications.

SUMMARY

Embodiments of the present invention relate to a power generator comprising one or more fuel cells and a fuel, wherein the fuel comprises an alkali metal silicide. Embodiments also relate to a fuel cell comprising a cathode current collector, a cathode electrically coupled to the cathode current collector, an anode in contact with a fuel. The fuel comprises an alkali metal silicide. The fuel cell also includes an anode current collector electrically coupled to the anode and an electrolyte membrane in contact with and separating both the cathode and anode.

Embodiments also relate to a hydrogen generator comprising a fuel cavity enclosing an alkali metal silicide and a membrane forming at least a portion of the cavity wall. When the alkali metal silicide is contacted with water through the membrane, hydrogen is generated. Methods of making a power generator are also described.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

To increase the energy density of fuels used in power generators utilizing fuel cells, alkali metal silicides may be reacted with water or water vapor to produce hydrogen. Some examples of alkali metal silicides are non-pyrophoric and allow for safer utilization and handling as compared to pure alkali metals.

The fuel may include one or more alkali metal silicides and may be mixed with hydrogen, for example. An alkali metal silicide is a compound including an alkali metal and silicon. Examples of alkali metals may be lithium (Li), sodium (Na), potassium (K), rubidium (Rb), cesium (Cs) and francium (Fr). The bonds holding the one or more alkali metal atoms bound with one or more silicon atoms may include covalent bonds, ionic bonds or metallic attractions, for example. An example of an alkali metal silicide is Na$_x$Si$_y$, where x and y are integers representing possible combinations of Na and Si atoms that form a stable complex. Further examples may be NaK alloys with silicon. Specific example compounds may be M-SG powders, such as Stage II Na-SG, purchased from SiGNa Chemistry, LLC, 530 E. 76th Street, Suite 9E, New York, N.Y. 10021. The alkali metal silicides may be in the form of powders or gels, for example. The example compounds are easily handled in an open ambient environment as they do not ignite or oxidize in air. Further, the compounds do not degrade for a reasonable amount of time. The alkali metal silicides react quickly and efficiently with water or water vapor to produce hydrogen gas. In addition, no catalyst is required to produce hydrogen gas. The alkali metal silicide fuel may be used with any of the embodiments disclosed herein.

An electrical power generator may generate hydrogen gas internally through the reaction of water vapor with an alkali metal silicide fuel, which hydrogen gas is reacted with atmospheric oxygen from the air at a fuel cell to generate electrical energy. The reaction of hydrogen and oxygen also produces water molecules as a byproduct at the fuel cell. This generated water may be passively diffused from the fuel cell as water vapor to a fuel chamber or cavity that contains the fuel substance, where it reacts with the fuel substance to generate hydrogen gas. The electrical energy generated may be used to power large or small devices that are connected to the power generator, depending on the size of the power generator. The power generator of the embodiments of the invention is particularly useful for powering miniature devices such as wireless sensors, cellular phones or other hand held electronic devices that are electrically connected to the anode and cathode of the one or more fuel cells of the power generator.

The silicide fuel may also be utilized in a hydrogen generator, independent of or integrated with a power generator. An example of a hydrogen generator may be a silicide fuel enclosed in a cavity with at least a portion of the cavity including a permeable membrane. The membrane may be permeable to water and hydrogen, for example. Water from ambient may permeate the membrane and react with the hygroscopic silicide to generate hydrogen. The process may be unregulated or pressure regulated by a valve, for example. The hydrogen may contact one or more fuel cells to complete a power generator, for example.

Figure 1:
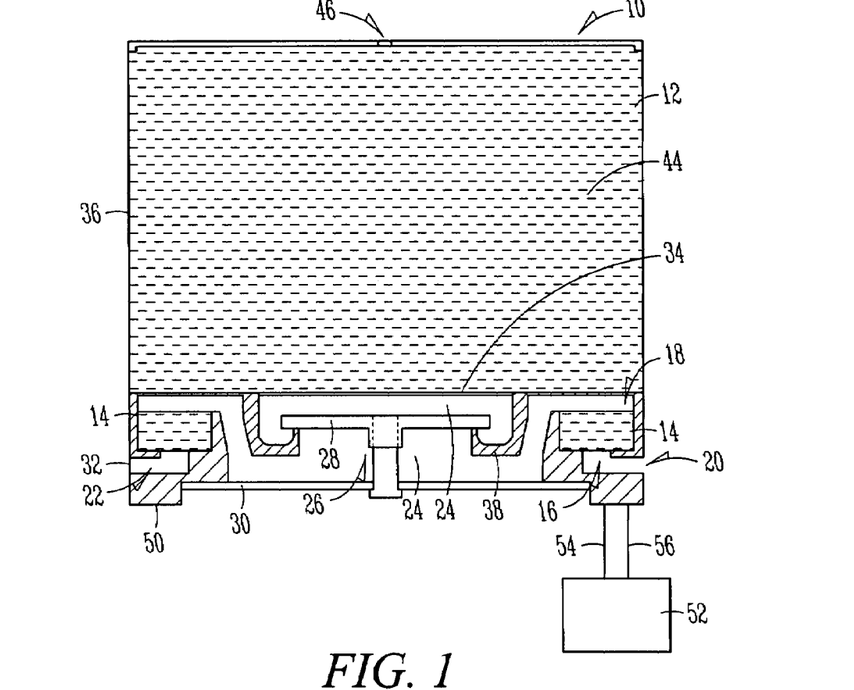
FIG. 1 illustrates a cross-sectional schematic representation of a power generator of the invention without an oxygen permeable, water vapor impermeable membrane united with an air inlet of the generator, according to some embodiments.
Figure 2:
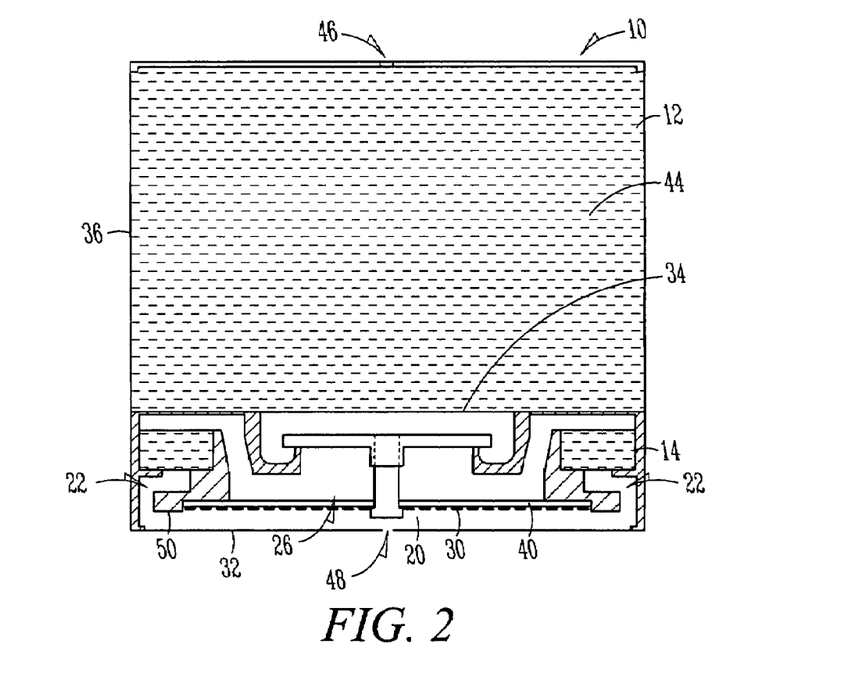
FIG. 2 illustrates a cross-sectional schematic representation of a power generator of the invention having an oxygen permeable, water vapor impermeable membrane united with an air inlet of the generator, according to some embodiments.

FIGS. 1 and 2 illustrate cross-sectional views of alternate power generator apparatuses for carrying out the process of the invention. As seen in FIG. 1 and FIG. 2, an electrical power generator 10 includes a housing 36, at least one fuel cell 14 mounted within the housing 36, at least one fuel chamber 12 for storing a fuel substance 44 mounted with the housing 36, and a cavity 24 within the housing 36 extending from the at least one fuel cell 14 to the fuel chamber 12. Cavity 24 admits a flow of hydrogen gas from the fuel chamber 12 to the fuel cell 14, and admits a flow of water vapor from the fuel cell 14 to the fuel chamber 12. Fuel cell 14 generates electricity and fuel cell water from the reaction of hydrogen gas and oxygen gas from the air. Atmospheric oxygen enters into the housing 36 through at least one air inlet 20. The oxygen gas then travels to the fuel cell 14 where it reacts with hydrogen gas, generating electricity and water molecules. The type of fuel cell used herein is referred to as a Proton Exchange Membrane (PEM) fuel cell, also known as a Polymer Electrolyte Membrane.

Figure 4:
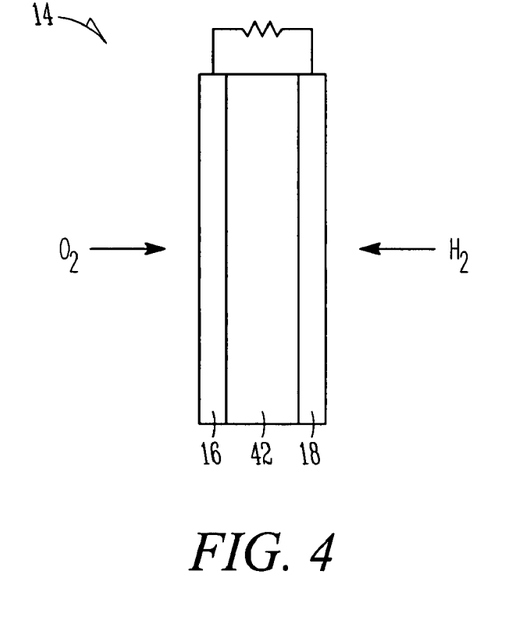
FIG. 4 illustrates a schematic representation of a fuel cell, according to some embodiments.

As seen in FIG. 4, a typical PEM fuel cell includes an electrolytic membrane 42 positioned between a negatively charged electrode, or cathode 16, on one side of the membrane, and a positively charged electrode, or anode 18, on the other side of the membrane. In typical hydrogen-oxygen PEM fuel cell behavior, a hydrogen fuel (e.g. hydrogen gas) is channeled through flow field plates to the anode, while oxygen is channeled to the cathode of the fuel cell. At the anode, the hydrogen is split into positive hydrogen ions (protons) and negatively charged electrons. The electrolytic membrane allows only the positively charged ions to pass through it to the cathode. The negatively charged electrons must instead travel along an external circuit to the cathode, creating an electrical current. At the cathode, the electrons and positively charged hydrogen ions combine with oxygen to form water molecules.

Inside the generator, on the anode 18 side of the fuel cell, an initial flush of hydrogen gas may be provided to remove residual air from within the power generator. This initial flush of hydrogen gas serves a dual purpose, as it will also react with atmospheric oxygen at the fuel cell, generating an initial amount of electrical energy and generating an initial amount of fuel cell water at the fuel cell cathode 16. This initial amount of fuel cell water is then reclaimed and reacted with the fuel substance 44. Alternately, the process of the invention may be initiated by the permeation of water molecules from the humidity of the atmosphere outside the power generator, through the air inlet 20, and into the power generator. It is also possible to add an initial amount of non-fuel cell water to the generator, in an amount substantially less than the amount of fuel cell water generated by the fuel cell, to react with the fuel substance 44 and initiate hydrogen gas generation. Such start-up water may be added to the generator, for example, through an opening in the fuel chamber 12, such as entry 46, or through another suitable means, such as through air inlet 20. However, the process and apparatus of the invention are designed to operate without an externally provided water supply, i.e. the system is water-less except for water that is generated by the fuel cell and water molecules present in the atmosphere outside of the power generator. There is no incorporated or connected water supply, such as a water chamber or water reservoir, to provide water for reaction with the hydrogen fuel substance. This results in a significant improvement in the energy density and specific energy of the power generator compared to conventional systems. Accordingly, the power generator allows for a continuous, self-regulating process since the hydrogen-oxygen reaction produces exactly the required water corresponding to the electrical power generated, wherein stoichiometric amounts of recycled water and fuel are used.

Figure 3A:
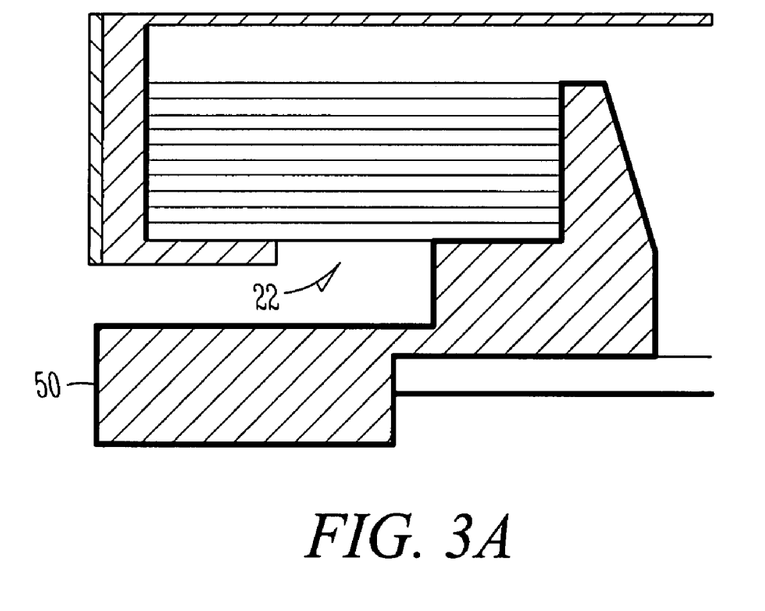
FIG. 3A illustrates a cross-sectional schematic representation of a corner of the power generator illustrated in FIG. 1 illustrating a water retention zone between the air inlet and the fuel cell cathode, according to some embodiments.
Figure 3B:
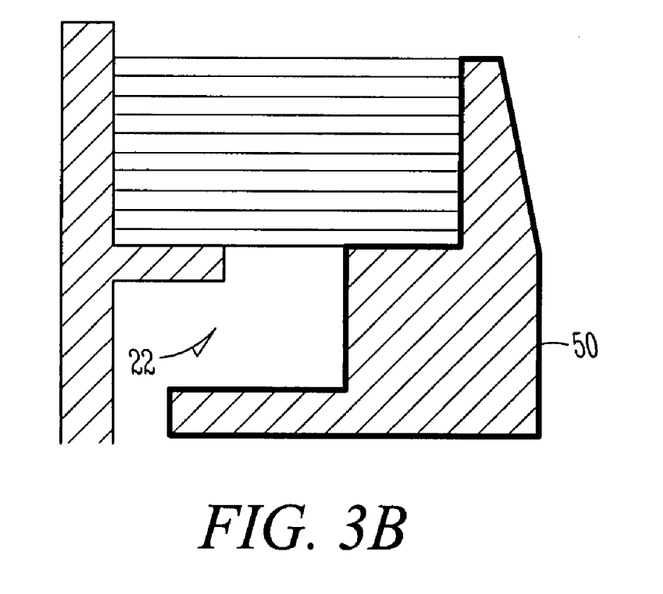
FIG. 3B illustrates a cross-sectional schematic representation of a corner of the power generator illustrated in FIG. 2 illustrating a water retention zone between the air inlet and the fuel cell cathode, according to some embodiments.
Figure 6:
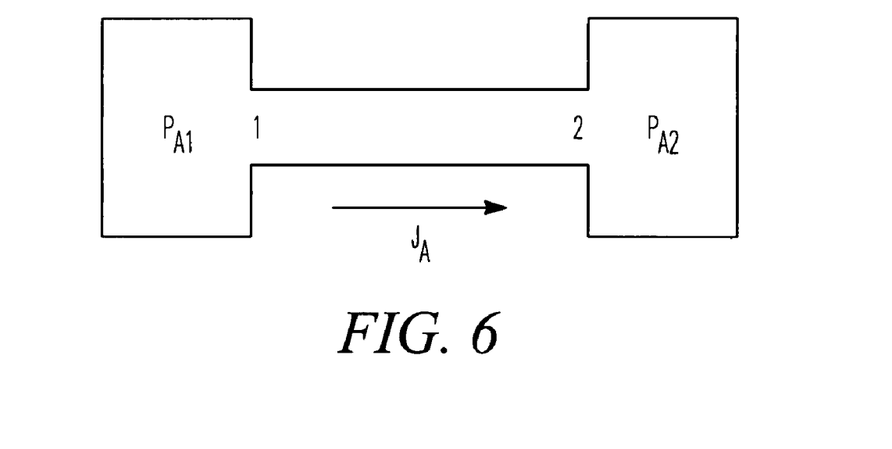
FIG. 6 illustrates a schematic representation of the molar flux of water vapor from one location to another, according to some embodiments.

The process may also be passive, running without actively controlled valves or pumps. More particularly, once water is formed as a by-product of the oxygen-hydrogen reaction at the fuel cell 14, the produced water passively diffuses back through the fuel cell 14, into the cavity 24 and to the fuel chamber 12. This passive diffusion is enabled in part due to one or more water retention zones 22, and in part due to the low humidity inside the cavity 24. Water retention zone 22 is highlighted by FIGS. 3A and 3B which offer corner views of the power generators illustrated in FIGS. 1 and 2. As used herein, and as shown in FIGS. 3A and 3B, a water retention zone 22 includes the channel extending from the air inlet 20 to each the fuel cell cathode 16. A water retention zone 22 is present at each fuel cell 14 which generates fuel cell water. Due to the geometry of the water retention zone 22, diffusive water loss of fuel cell generated water molecules out of the air inlet is deterred, thereby maintaining a high concentration of water vapor at the fuel cell cathode 16. Instead of losing water molecules to the ambient air, water retention zone 22 causes generated water molecules to accumulate at the cathode 16, creating a region of high humidity between the cathode 16 and air inlet 20. This molar flow rate can be described with more specificity via the equation below with reference to FIG. 6:

$$J_A = \frac{D_{AB} * (P_{A1} - P_{A2})}{R * T * (Z_2 - Z_1)}$$

The transport of water vapor from the cathode 16 to the ambient air, and the transport of oxygen from the ambient air to the cathode 16 are both diffusion controlled processes. The molar flux, or molar flow rate, of A is $J_A$, where A is the desired species, i.e. either water or oxygen. The molar flux of water or oxygen is a function of the diffusivity $D_{AB}$, the partial pressure difference between point 1 and point 2 ($P_{A1}-P_{A2}$), the gas constant R, the temperature T in Kelvin, and the distance between points 1 and 2 ($Z_2-Z_1$). Additionally, flux is defined as per area, with units of $$\frac{kg\,A}{m^2\,sec}$$

(kilograms of A, per $m^2$ second).

The diffusion coefficient is the proportionality constant between the flux of a species to its concentration gradient. The diffusion coefficient $D_{AB}$ refers to the diffusion coefficient of species A in species B. In the present case, it refers to the diffusion coefficient of water vapor in air, or the diffusion coefficient of oxygen in air. A large diffusion coefficient will yield a large flux value, and a small diffusion coefficient will yield a small flux value. The diffusion coefficient for oxygen in air is about 0.21 $cm^2$/sec at room temperature and normal room humidity, while the diffusion coefficient for water vapor in air at room temperature and humidity is about 0.24 $cm^2$/sec.

Partial pressure is the fraction of the total pressure of a mixture of gases that is due to one component of the mixture. A large partial pressure difference will generate a relatively large flux of the species, while a small partial pressure difference will generate a relatively small flux. The water retention zone is designed to give a small partial pressure difference, e.g. about 10% to about 20% of atmospheric oxygen partial pressure, to obtain the oxygen flux required for the desired power level.

The gas constant is a product of Boltzmann's constant and Avogadro's number. The temperature in Kelvin affects the flux of the species of interest. Higher temperatures tend to reduce flux, while lower temperatures tend to increase flux. Thus, the diffusion of gases, and by extension, their partial pressure differences, can be controlled by adjusting the channel geometry.

With reference to FIG. 6, to control the diffusion of a gas between point 1 and point 2, the geometry of the channel which separates the two points can be changed. For example, if the area of the channel which separates point 1 and point 2 is increased, diffusion between points 1 and 2 is increased, and conversely if the area is decreased, diffusion is reduced. The opposite applies to the distance between point 1 and point 2, whereby increasing the distance between points 1 and 2 results in reduced diffusion, and decreasing the distance between points 1 and 2 results in greater diffusion out of air inlet 20.

The power generators of the invention as seen in FIGS. 1 and 2 are designed to allow enough oxygen to diffuse from the ambient air, through the air inlet 20 and to the cathode 16 with only a small pressure drop, e.g. 10% to 20% of the atmospheric oxygen pressure. The power generator will have high hydrogen permeation losses and thus reduced lifetime if operated at high pressures.

The chemical reaction that converts hydrogen and oxygen to water (2H2+O2→2H20) creates two moles of water for every mole of oxygen it consumes. Further, the diffusivity of water vapor in air and the diffusivity of oxygen in air are similar. Accordingly, the partial pressure difference of water vapor must be roughly twice that of oxygen to maintain equilibrium. Therefore, the power generator of the invention having the above proportions maintains a humidified environment instead of losing the generated water molecules to the atmosphere outside the generator.

Within the cavity 24, on the anode 18 side of the fuel cell 14, a comparatively low humidity region exists due to the moisture absorbing, hygroscopic nature of the fuel substance 44. Accordingly, the water generation and retention at the cathode 16 generates a moisture concentration gradient and a gas pressure differential which causes water molecules to diffuse back through the fuel cell 14, into the cavity 24 and to the fuel chamber 12 in the form of water vapor. This water vapor then reacts with fuel substance 44, generating hydrogen gas. The generated hydrogen gas will then pass through cavity 24 and to the fuel cell anode 18 where it will react with oxygen to once again generate water molecules. This cycle may optionally continue until all of the fuel substance 44 is consumed.

During operation of the power generator, more generated water vapor will diffuse back into the cavity than is lost out of the air inlet. Furthermore, fuel cell output is directly dependent on the flow of oxygen and hydrogen reactants to the fuel cells, and hence the flow of water vapor the fuel chamber. Accordingly, fuel cell output is proportional to the ratio of the area of the water retention zone to its length. In an embodiment of the invention, the ratio of zone area to zone length per unit of power may be from about 0.01 cm/mW to about 0.05 cm/mW of power output for a single fuel cell. If multiple fuel cells are incorporated, this ratio of zone area to zone length per unit of power is divided by the number of fuel cells which share the reactants.

The generator will operate at reduced power if the geometry of the water retention zone 22 is too restrictive to allow sufficient oxygen to diffuse to the fuel cells 14. Particularly, at a zone area to length ratio of greater than 0.05 cm2 area/1 cm length, excess water vapor will diffuse out of the air inlet, and at a zone area to length ratio of less than 0.01 cm2 area/1 cm length, not enough oxygen will reach the fuel cells to operate at a high efficiency. The same is true for the geometry of the cavity within the housing extending from the fuel cell to the fuel chamber, which admits a flow of hydrogen gas from the fuel chamber to the fuel cell, and which admits a flow of water vapor from the fuel cell to the fuel chamber.

In another embodiment, the power generator 10 may further include at least one valve 26 for regulating the flow hydrogen gas from the fuel chamber 12 to the fuel cell 14, and for regulating the passage of water vapor from the fuel cell 14 to the fuel chamber 12. As shown in FIGS. 1 and 2, valve 26 is positioned within the cavity 24 between fuel chamber 12 and the fuel cell 14. In an embodiment of the invention, valve 26 includes a pneumatic valve that is controlled by gas pressure within said cavity 24, pneumatically adjusting the conductance of water vapor to the fuel chamber 12. Valve 26 may include a pneumatically actuated flexible diaphragm 30 having a periphery that may be fixed to the power generator housing 36 at a support 50; a valve disc 28 positioned opposite the diaphragm 30; and a rod connector joins the valve disc 28 and diaphragm 30. The valve 26 is in a closed position when the valve disc 28 is in contact with a seal 38, preventing water vapor from reaching the fuel chamber 12. Alternately, the valve is in an open position when the valve disc is separated from seal 38, allowing water vapor to reach the fuel chamber 12 and allowing generated hydrogen gas to reach the fuel cells 14. Seal 38 may include a portion of housing 36. Support 50 may also include part of housing 36. As seen in FIGS. 1 and 2, the fuel cell or fuel cells 14 may be mounted inside the housing by support 50.

The dimensions of the component parts of the valve may be very small in scale but may vary with respect to the particular application of the valve. The diaphragm thickness and diameter should be within a certain range depending on the desired power output. In one embodiment of the invention, the diaphragm 30 may include a thin circular plate having a diameter of from about 1 cm to about 3 cm, from about 1 cm to about 2 cm. The valve disc 28 may have a diameter of from about 0.2 to about 1 cm, from about 0.2 cm to about 0.5 cm. In an embodiment of the invention, the rod connector may include a screw or a bolt, but any other means of connecting the diaphragm 30 to the valve disc 28 is suitable such that the valve can alternate between the open and closed positions.

The actuation of the valve may be controlled by the internal gas pressure exerted on the diaphragm 30. As the internal gas pressure of the apparatus rises due to the generation of hydrogen gas, the diaphragm 30 will bend or push outward slightly. This causes the connector to pull the valve disc 28 against the seal 38, closing the valve and preventing the flow of additional water vapor to the fuel chamber 12. With the valve closed, hydrogen production ceases. This also prevents the internal gas pressure from rising further. As hydrogen is consumed, such as by fuel cells 14, the internal gas pressure drops, allowing the valve disc 28 to disengage the seal 38 and opening the valve. Accordingly, hydrogen gas is automatically produced at the rate at which it is consumed.

In an embodiment of the invention, the power generator 10 operates by maintaining a fixed pressure, via the pneumatic valve 26. The power generator 10 should be able to operate down to low ambient pressures at reduced power output, and up to theoretically unlimited ambient pressures at full power output. In an embodiment of the invention, the internal H2 pressure of the apparatus when in the closed position is from about 0 kPa to about 1000 kPa. The valve will be fully shut when no hydrogen gas is used by the fuel cell, and will open the amount required to meet consumption rate of the hydrogen gas. In an embodiment of the invention, the internal pressure of the power generator is maintained at about 100 kPa at all times, wherein when the pressure drops below about 10 kPa, the valve will open slightly until the internal pressure raises to at or above about 500 kPa, causing the valve to close. Operating pressures may be from about 0.5 atm (about 50 kPa) to about 2 atm (about 202 kPa) for small scale applications such as portable electronic devices or wireless sensors.

In general, the power generator 10 operates by maintaining a fixed pressure, usually a few psi over ambient, using the pneumatic valve 26. Generator 10 may operate down to low ambient pressures at reduced power output, and up to theoretically unlimited ambient pressures at full power output.

The power generator 10 may be maintained at an operating temperature of from about −40° C. to about 85° C., from about −20° C. to about 50° C., from about 0° C. to about 50° C. and from about 20° C. to about 50° C. while in use, for example.

For the purposes of this invention, the term "water vapor" does not include steam. While "water vapor" and "steam" are both forms of water, each has very different properties and uses. For example, a locomotive can be driven by steam, but will not operate on the water vapor present in humid air, as does the present invention. In and of itself, "water vapor" is the gas of individual water molecules that may form naturally over a body of water at any temperature, including ice, or that may be naturally present in ambient air. It has a low partial pressure, so it contains relatively few water molecules unless the water that forms it is heated. On the other hand, "steam" is made up of tiny hot water droplets produced by heating water to boiling. Steam contains about 100× more water molecules than does water vapor at 15° C., naturally expands with high force and velocity, and large amounts of water can be boiled and transported off as steam. Water vapor is present in everyday air and contains a much smaller number of water molecules than steam or liquid water, and moves very slowly by natural diffusion. Only very small amounts of water can be transported in the form of water vapor. To illustrate, a single drop of water takes typically one hour to evaporate at room temperature, while an entire kettle of water can be boiled into steam in about twenty minutes. Further, a steam powered generator would require a water supply or water source from which steam may be generated. In contrast, the present invention provides an improvement upon the related art by eliminating such a water source. Accordingly, the apparatus and process of the present invention are designed to function at low operating temperatures using water vapor, not at high operation temperatures using steam.

As seen in FIGS. 1 and 2, the power generator 10 may further include a restriction 32 united with the air inlet 20, regulating the diffusion of atmospheric oxygen and atmospheric water molecules into the power generator. This restriction also aids in raising the humidity at the fuel cell cathode 16 due to impedance presented to outward diffusion of water vapor produced at the cathode 16. This increased humidity improves the operation of the fuel cell. The restriction may include a hydrophobic membrane that is substantially permeable to atmospheric oxygen gas, but substantially impermeable to water vapor, which membrane substantially obstructs the flow of fuel cell water into the atmosphere. Suitable materials for this oxygen permeable, water vapor impermeable membrane having the desired properties include fluoropolymer containing materials such as fluorinated ethylene propylene (FEP), perfluoroalkoxy, and non-fluoropolymer containing materials such as oriented polypropylene (OPP), low density polyethylene (LDPE), high density polyethylene (HDPE) and cyclic olefin copolymers (COCs). The oxygen permeable, water vapor impermeable membrane material may be manufactured of fluorinated ethylene propylene, for example. In addition, for some embodiments, the membrane alone may not allow sufficient oxygen permeation to the cathode. Accordingly, a small opening 48 (see FIG. 2) in the restriction 32 may be provided to allow the ingress of extra atmospheric oxygen and atmospheric water molecules into the cavity to diffuse to the fuel cell cathode or cathodes. However, this opening may also cause some of the water vapor to diffuse out of the power generator 10. The required opening size is a function of the power level, the diffusion path length, and the desired partial pressure drop. The size of this opening may be very small in size and may include from about 0.001% to about 1% of the entire surface area of the membrane.

The substantially non-fluid substance within the fuel chamber 12 may include a material in powder, granule or pellet form and may be an alkali metal silicide. An alkali metal silicide is a compound including an alkali metal and silicon. Examples of alkali metals may be lithium (Li), sodium (Na), potassium (K), rubidium (Rb), cesium (Cs) and francium (Fr). The bonds holding the one or more alkali metal atoms bound with one or more silicon atoms may include covalent bonds, ionic bonds or metallic attractions, for example. An example of an alkali metal silicide is NaxSiy, where x and y are integers representing possible combinations of Na and Si atoms that form a stable complex. Further examples may be NaK alloys with silicon. Specific example compounds may be M-SG powders, such as Stage II Na-SG, purchased from SiGNa Chemistry, LLC, 530 E. 76th Street, Suite 9E, New York, N.Y. 10021. The alkali metal silicides may be in the form of powders or gels, for example. The example compounds are easily handled in an open ambient environment as they do not ignite or oxidize in air. Further, the compounds do not degrade for a reasonable amount of time. The alkali metal silicides react quickly and efficiently with water or water vapor to produce hydrogen gas. In addition, no catalyst is required to produce hydrogen gas. The alkali metal silicide fuel may be used with any of the embodiments disclosed herein.

As seen in FIGS. 1 and 2, fuel chamber 12 may be bordered by porous vapor membrane 34. This membrane 34, attached to the housing 36 and juxtaposed with the fuel chamber 12, is necessarily permeable to water vapor, so as to allow water vapor to pass into the fuel chamber 12 and react with the fuel substance, thereby generating hydrogen gas. It is also necessarily permeable to hydrogen gas, so as to allow generated hydrogen gas to pass into the cavity 24 and back to the fuel cell 14. Suitable materials for this vapor membrane 34 having such dual properties non-exclusively include porous polymers including fluoropolymers, including expanded-polytetrafluoroethylene (ePTFE) laminates such as expanded Teflon®. Examples of ePTFE laminates include GORE-TEX® manufactured by W. L. Gore & Associates, Inc. of Delaware, and eVENT®, manufactured by BHA technologies of Delaware.

Referring to FIG. 2, in particular, is a cross-sectional schematic representation of an alternate power generator of the invention having an air inlet with a larger surface area compared to the generator of FIG. 1. Similarly, in this embodiment, a hydrophobic membrane 32 that is substantially permeable to atmospheric oxygen gas, but substantially impermeable to water vapor, may be placed at air inlet 20. However, in order to allow for the intake of water molecules from natural air humidity in the atmosphere, a small opening 48 (e.g. about 0.008 cm2) opening may be cut into the membrane 32. This opening 48 will also allow extra oxygen to diffuse to the fuel cell cathodes. In an embodiment of the invention, the power generators of the invention will perform best when in an environment having a relative humidity of at least about 5%, wherein the performance will improve with increasing humidity.

The embodiment of FIG. 2 also includes a pneumatic valve 26 which may include a mesh diaphragm 30 and a water permeable, hydrogen impermeable membrane 40 in juxtaposition with the mesh diaphragm 30 of the valve 26. The mesh diaphragm 30 may be permeable to water vapor and is formed from a polymeric material, such as polyethylene terephthalate or a metal such as stainless steel. Suitable water permeable materials for this water permeable membrane 40 include perfluorinated polymers such as perfluorosulfonate ionomers. Also suitable are epoxides and chloroprene rubber. The water permeable membrane may include a perfluorosulfonate ionomer membrane commercially available under the trademark Nafion® from EI DuPont de Nemours & Co. of Delaware. Nafion® may be utilized because it has a fluorinated backbone that makes it very stable, with sulfonic acid side chains to support high ionic conductivity. The water permeable, hydrogen impermeable membrane 40 allows the diffusion of water vapor to the fuel chamber 12 without passing the water vapor through the electrolytic membrane 42. It provides a large area path for water vapor to permeate into the fuel chamber and may allow the fuel cells 14 to operate at higher current densities than if the water is recovered solely though the fuel cells themselves. A similar material forms the electrolytic membrane 42 of the at least one fuel cell 14.

Accordingly, as can from FIG. 2, this power generator 10 provides dual avenues for the transport of fuel cell generated water molecules from the fuel cell cathode 16 to the fuel chamber 12. Specifically, in the embodiment of FIG. 2, the reaction of hydrogen gas and atmospheric oxygen in the fuel cell 14 results in the generation of fuel cell water at the fuel cell cathode 16, and thereby generates electricity. This generated fuel cell water is retained in the water retention zone 22 and may re-enter cavity 24 by either diffusing back through the fuel cell 14, or by diffusing from the water retention zone 22 and permeating through the mesh diaphragm 30 and water permeable membrane 40.

Figure 7:
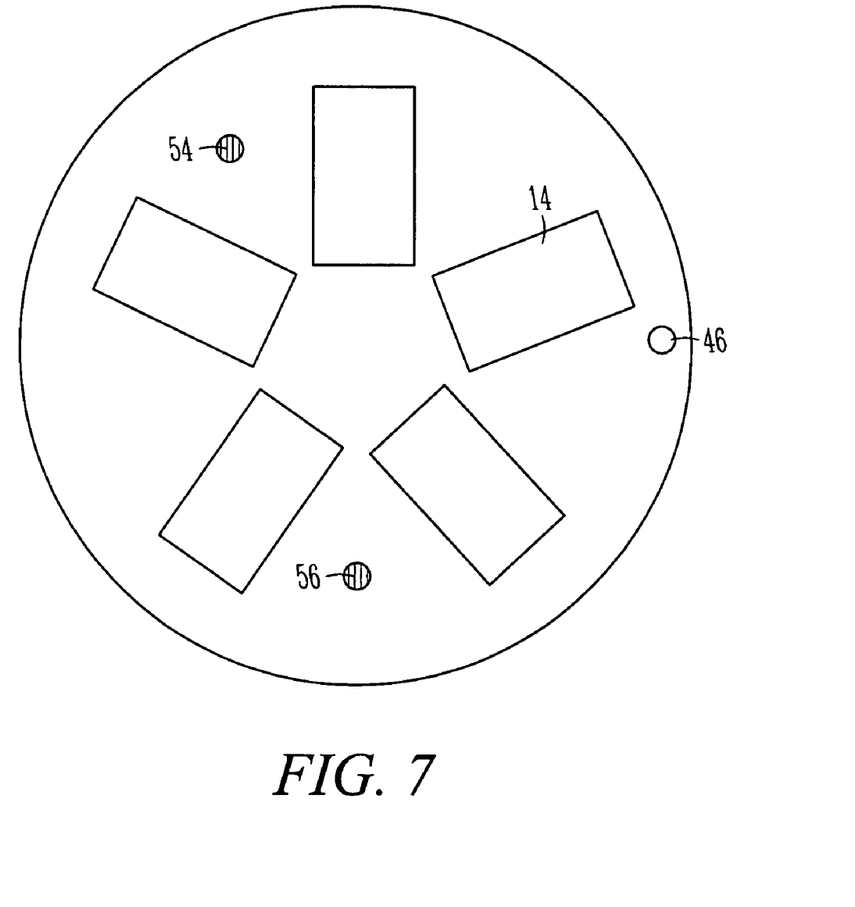
FIG. 7 illustrates a top-view of a cylindrical power generator of the invention incorporating a plurality of fuel cells, according to some embodiments.

Illustrated in FIG. 7 is a top view of a cylindrical power generator 10 of the invention having a plurality of fuel cells. As seen in FIG. 7, a plurality of fuel cells 14 are positioned around a circumference of the power generator 10. A power generator 10 of the invention may also include an entry 46, through which fuel substance 44 may optionally be replenished. Alternately, when fuel substance 44 is consumed, the power generator may be disposed, similar to a battery. Each of the assembled component parts of the power generator 10 may further be enclosed in a suitable hollow structure such as a tube formed from a suitable material, such as polyethylene terephthalate (not shown), which enclosure may also be capped on the top and/or bottom surfaces with a suitable cap (not shown), which cap may be removable and may be formed of a similar or different material as the enclosure. The power generator 10 also further includes at least one electrical connector through which a device may be electrically connected to the power generator 10. As illustrated in FIG. 1, a device 52 (schematically represented, not drawn to scale) is electrically connected to the power generator 10 through electrical connectors 54 and 56, which electrical connectors 54 and 56 are connected to the cathode(s) and anode(s) of the fuel cell(s). Electrical connectors 54 and 56 are also illustrated in FIG. 7. In embodiments incorporating a plurality of fuel cells, the plurality of fuel cells may be connected in series, and may be connected to a single set of electrical connectors 54 and 56 protruding from the generator housing 36. In an embodiment of the invention, the power generator 10 includes eight interconnected fuel cells.

Each of the parts of the power generator 10 and the valve 26 may be fabricated of a suitable polymeric material, a metal or other material as determined by the requirements of the intended use of the generator and valve. A material may include polyethylene terephthalate. The dimensions of the component parts of the power generator 10 may be very small in scale, but may also vary with respect to the use of the power generator 10. The outer dimensions of such a waterless, micro-power generator may be from about 1 mm to about 100 mm in length, from about 1 mm to about 100 mm in width, and from about 1 to about 100 mm in depth, from about 1 mm to about 25 mm in length, from about 1 mm to about 25 mm in width, and from about 1 to about 25 mm in depth, for example. Such a waterless, micro-power generator is capable of incorporating one or more fuel cells 14 which fuel cells may range in size from about 0.1 mm2 to about 5,000 mm2. A waterless, micro-power generator of the invention is also capable of containing a volume capacity of from about 0.1 mm3 to about 15,625 cm3. A larger power generator may have dimensions of up to at least about 50 cm or more in length, width and depth, up to at least about 5000 cm2 or more in fuel cell area and up to at least about 0.125 m3 or more in power generator volume. These dimensions may vary widely and are not intended to be limiting. The dimensions of each of the component parts of the power generator may similarly vary as could be determined by one skilled in the art in such a manner that the power generator of the invention will operate as intended.

Figure 5:
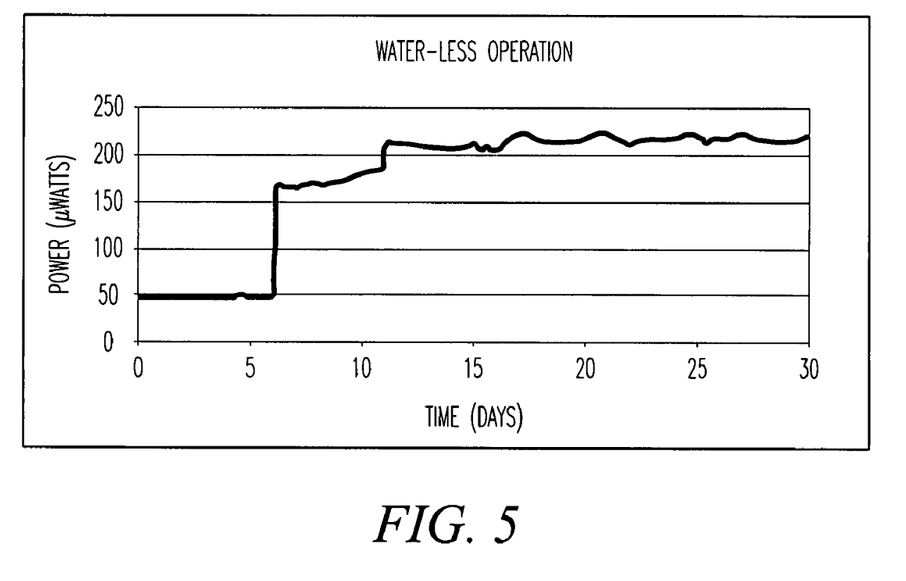
FIG. 5 illustrates a plot of power output versus time for a power generator of the invention, according to some embodiments.

Each of the embodiments illustrated in FIGS. 1 and 2 have been found to exhibit electrical conductivity in the absence of a provided, non-fuel cell water source. FIG. 5 and Example 1 below offer an example of the power output vs. time plot for a small-scale, micro-power generator of the invention. A micro-power generator of the invention may produce a power output of from about 1 micro Watt to about 100 milli Watts, from about 1 micro Watt to about 1000 milli Watts, and energy densities of from about 0.1 W-hr/cc to about 10 W-hr/cc. Larger power generators of the invention may produce power output levels of from about 0.1 W to about 100 W and energy densities of from about 0.1 W-hr/cc to about 10 W-hr/cc.

It should be further understood that while the exemplified embodiments of FIGS. 1 and 2 represent power generator apparatuses of the invention, such structures are not intended to be limiting. Other design variations that perform in a substantially similar manner, i.e. waterless power generators capable of producing useful levels of electricity with hydrogen-oxygen fuel cells including an alkali metal silicide, are incorporated within the scope of the invention.

The following example serves to illustrate the invention:

Example 1

A power generator as seen in FIG. 1 was provided and given an initial flush of hydrogen gas. The initial flush evacuated air from the generator cavity, and was thereafter consumed by the fuel cell, producing electricity and byproduct water. Following consumption of this initial hydrogen flush, hydrogen gas was continuously generated internally, as well as electricity. The power output of the generator was measured over time. The results are shown in FIG. 5, which is a plot of the power output of the power generator versus time. Power output was initially set at 50 microWatts, but was later increased to 170 and then to 210 microWatts, where it was maintained for the duration of a 30 day test. During the first 20 days of the test, ambient laboratory air relative humidity varied between about 10 to 20 percent. Laboratory air temperature was about 23° C. The initial flush of hydrogen was estimated to have been consumed in about the first day of operation. For this waterless operation, the required water is back-permeating through the fuel cells themselves. Internal gas pressure was stable over a range of operating power levels, and the amount of cathodic water was exactly the right amount at any power level. The possible net gains from water recycling are an approximate 2× reduction in system volume and weight, reduced cost and complexity, and greater safety, due to the elimination of liquid water that must be loaded. Better hydration of the PEM is also achieved due to the humidity of the air over the cathodes.

Figure 8:
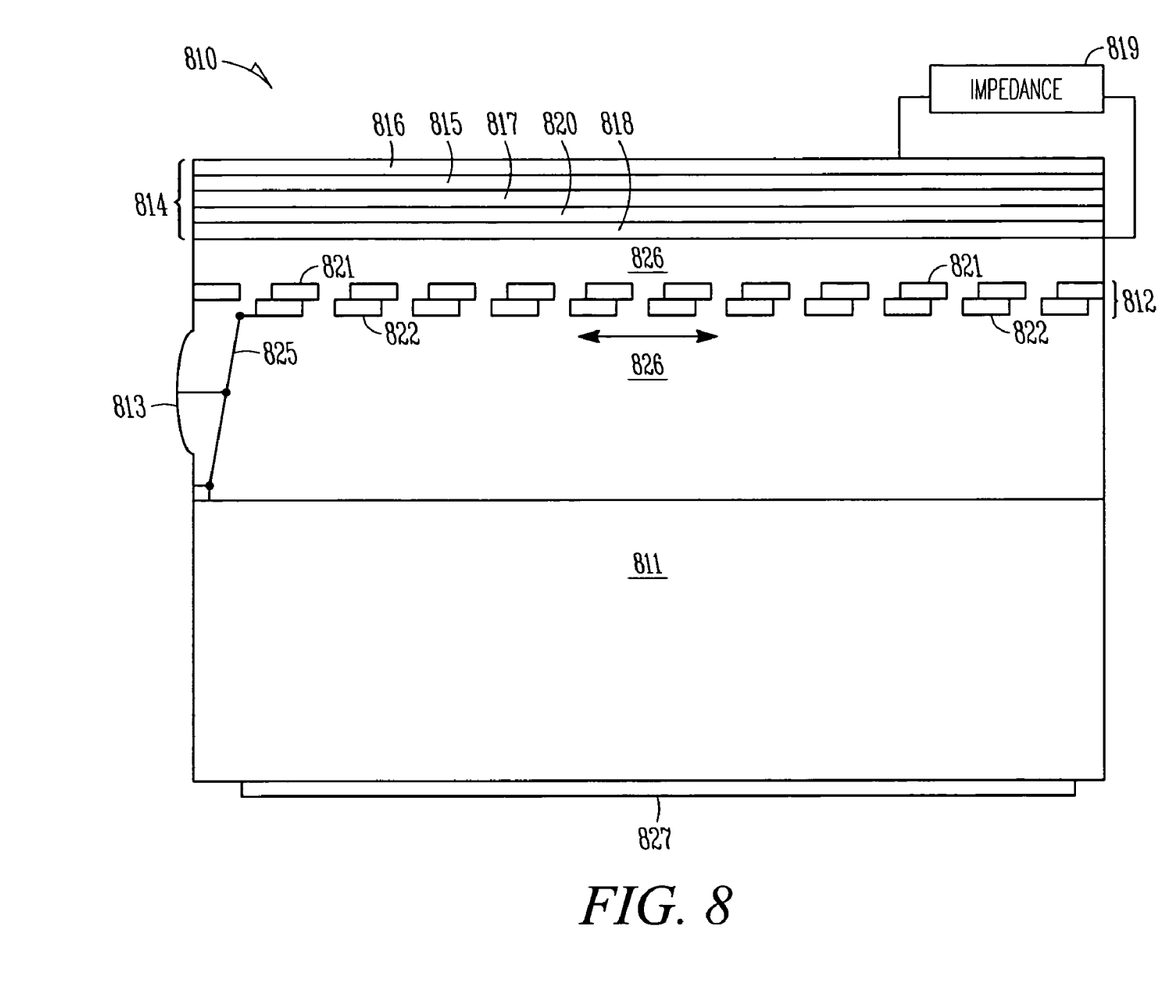
FIG. 8 illustrates a sectional side view of a fuel cell, according to some embodiments.

FIG. 8 shows a fuel cell power generation system 810 having a fuel container 811, a mesh, perforated plate or layer, or grid, or the like, type of valve 812 connected to a pressure sensitive diaphragm 813, and having a number of elements for a fuel cell 814 which are designed to provide electrical power. The elements may include a cathode electrode 816, a cathode gas diffusion layer 815, a membrane 817, an anode gas diffusion layer 820, and an anode electrode 818. In the present example, the fuel cell may be on one side (or at the top in FIG. 8) of the block-like configuration 810 in FIG. 8. In the lower portion of the fuel cell assembly 810 may be a fuel container 811 which may contain a quantity of lithium alumina hydride or other cell fuel. A partial pressure may cause oxygen of the atmosphere to be drawn into a cavity 826. There is not a partial pressure for nitrogen of the atmosphere. The atmosphere may be dry and draw in some of the water. The oxygen may come in on the cathode 816 side of the plurality of elements or cell 814. Protons may move from the anode 818 to the cathode 16. There may be a water vapor which has a partial pressure but the vapor is kept in by a membrane. Electrons may be stripped from the H2 to result in protons going from the anode electrode 18 through an anode gas diffusion layer 820, a membrane 817 and a cathode diffusion layer 815 to the cathode 816. The electrons may constitute an electrical current that flows from the anode 818 through an impedance load 819 and to the cathode 816 where the electrons, protons and oxygen form a water vapor. Layer 817 may be a water vapor permeable electrolytic membrane. On the cathode may be an oxygen permeable; water vapor impermeable membrane. There may various approaches to the design of the fuel cell 814.

The valve 812 may be in place to regulate the water from going down, but not to keep the H2 from going up, relative to the orientation of assembly 810 in FIG. 8. Water may be a generated product at the cathode. There may be a gas impermeable layer at the number of elements or cell 814 to prevent water or vapor from going through while permitting protons to move through the cell. When the water vapor encounters the fuel from the container 811, hydrogen may be produced.

Figure 9A:
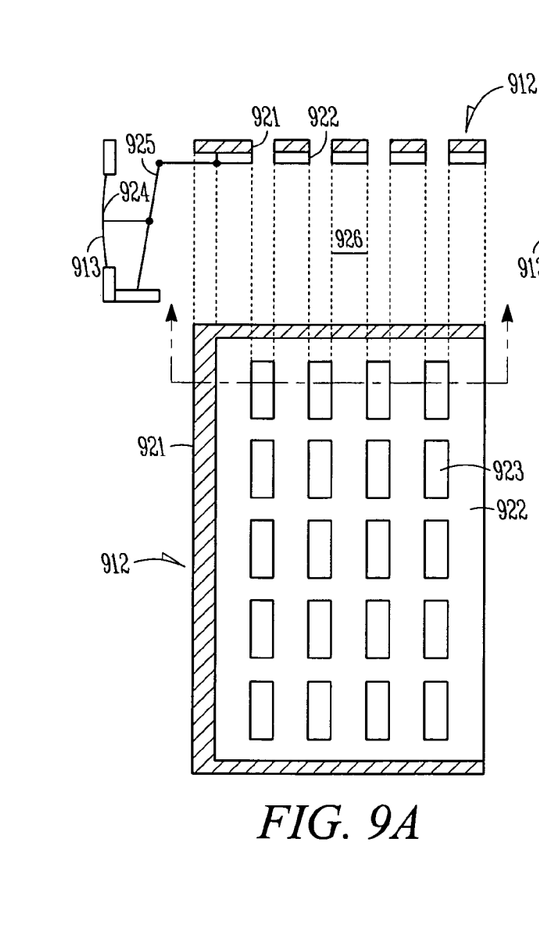
FIG. 9a, 9b and 9c illustrate three positions of a grid-like valve used in a fuel cell, according to some embodiments.
Figure 9B:
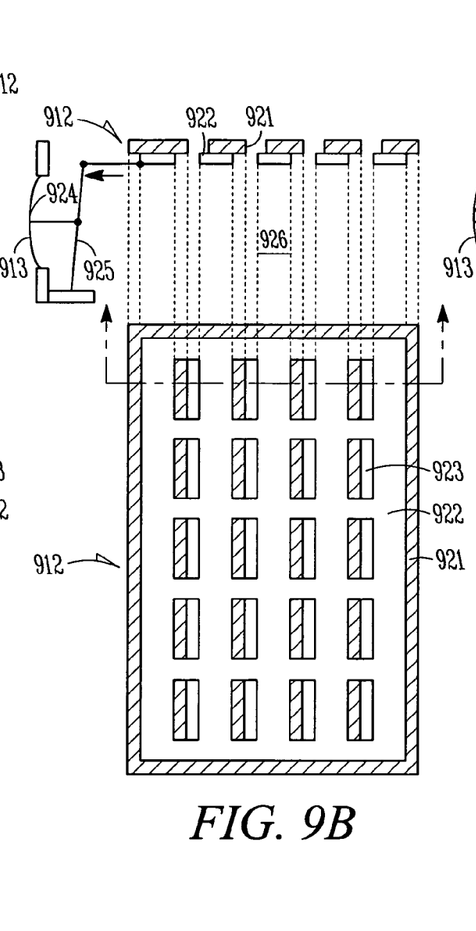
Figure 9C:
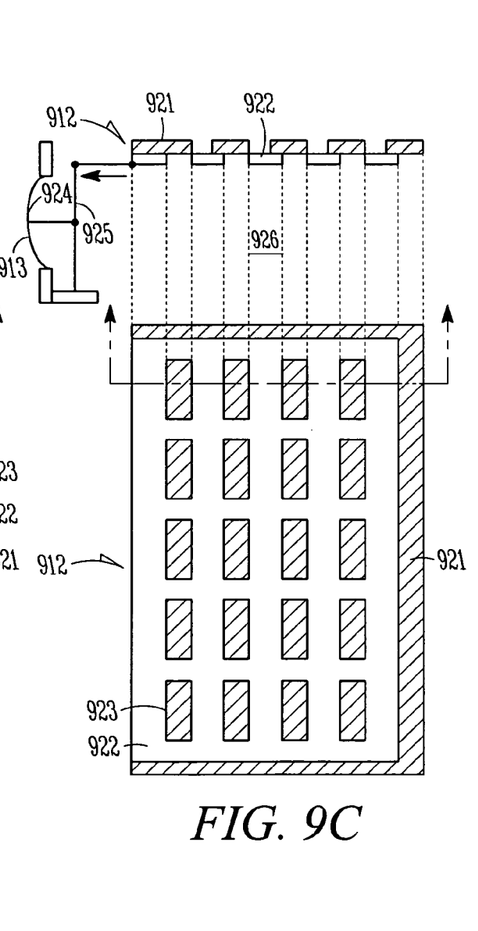

FIGS. 9*a*, 9*b* and 9*c* illustrate an operation of the valve in the present fuel cell design. The valve in FIG. 9*a* may be open. A diaphragm 913 may move the valve 912 to an open position and, on the other hand, move the valve 912 to a closed position as shown in FIG. 9*c*. The valve may have a partially open position as identified in FIG. 9*b*. Valve 912 may have two mesh-, grid- or plate-like parts 921 and 922. These parts may be of other forms or design to effect the operation described here. Part 921 may be stationary relative to the fuel cell assembly or system 810. Part 22 may be positioned on or adjacent to part 921. These parts 921 and 922 may be plates or the like with numerous openings 923 in them. The openings may be in the form of, for instance, small rectangular shapes laid out in a symmetrical pattern in both plates 921 and 922. With plate 922 overlaid on plate 921, the openings 923 may be aligned such that matter may flow through the pair of plates 921 and 922, as shown in FIG. 9*a*. Plate 922 may be moved left relative to plate 921 and the openings 923 will become partially closed as shown in FIG. 9*b*. If plate 922 is further moved left, the openings 923 may be closed in that portions of plates 921 and 922 overlap each other's openings, as shown in FIG. 9*c*.

Plate 922 may be moved by a diaphragm 913 which is pressure sensitive. If pressure of matter in the portion of the cell assembly in the volume 926 proximate to plate 922 increases, as shown in FIGS. 9*a*, 9*b* and 9*c*, then the diaphragm 913 may bulge out from the chamber volume 926 proximate to plate 922. Attached at about a center 924 of diaphragm 913 may be a linkage 925 that is attached to plate 922. When bulging out at the center 924 (to the left in the FIGS.) because of pressure, then the linkage 925 may likewise pull plate 922 to the left (in the FIGS.) to reduce the flow of matter or gas through the plates in response to the increased pressure. If the pressure increases even more, then diaphragm 913 may expand further out to its stop thereby causing plate 922 to have its non-open areas overlap plate 921 openings 923, and plate 921 to have its non-open areas overlap plate 922 openings and effectively stop the flow of matter (e.g., water vapor) through plates 921 and 922. As the pressure decreases in the chamber 926 proximate to plate 922, then diaphragm 913 may begin returning to a less bulged state and via the linkage 925 push plate 922 so that a part of the openings 923 of both plates 921 and 922 are uncovered or unclosed. Further reduction of the pressure in chamber 926 may result in diaphragm 913 returning to its initial open position thereby moving plate 922 so that the openings 923 of plates 921 and 922 are aligned such that none of the openings 923 in the plates are effectively obscured by either plate. Again, as the chamber 926 pressure increases, the valve 912 begins to close, and as the chamber 926 pressure decreases, the valve 912 begins to open. Thus, the amount of flow through the valve 912 may be determined by the chamber 926 pressure. This approach may provide a regulation of the flow or volume of the gas from chamber 926 through the valve.

Figure 10:
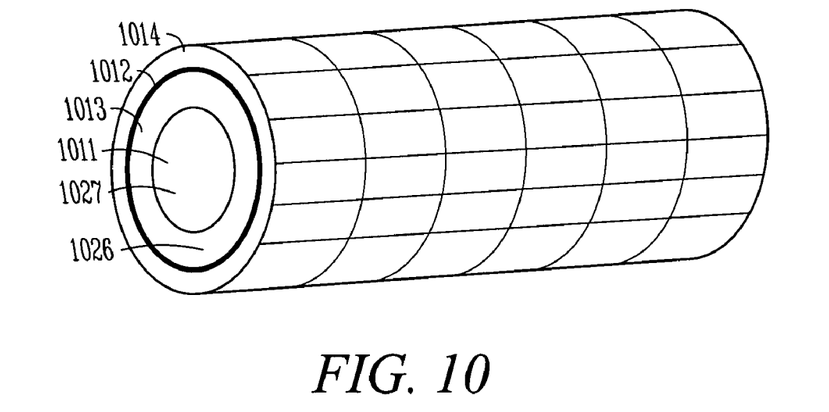
FIG. 10 illustrates a cylindrical shaped fuel cell utilizing the valve of FIGS. 9a, 9b and 9c, according to some embodiments.

The valve mechanism described in FIGS. 9a, 9b and 9c may be designed into a cylindrical fuel cell device 1030 as shown in FIG. 10. The mechanism may also be designed into a fuel cell generator assembly having some other shape. In FIG. 10, the fuel volume or supply may be in the center of the cylinder. Between the cell 1014 and the fuel supply container or chamber 1011 may be a cylindrical slide valve 1012. The valve may be two cylindrical sleeves of grid, mesh, perforated material, or the like, that are concentric and adjacent to each other. The parts 1021 and 1022 of the cylindrical valve may slide relative to each other to open and close the valve 1012 (like the parts 921 and 922 in FIGS. 9a-9c). On the outside of the circumference slide valve 1012 may be a fuel cell or cells 1014 (similar to the fuel cell 814 of FIG. 8).

A diaphragm 1013 for operating the cylindrical valve 1012 may be situated at the end of a cylindrical chamber 1026 and linked to a part 1021 or 1022 of valve 1012. Diaphragm 1013 may be responsive to pressure in chamber 1026 in that if the pressure increases, one of the valve 1012 parts 1021 and 1022 will be moved relative to the other by the linked diaphragm 1013 to close the valve 1012, and if the pressure decreases, then the valve 1012 will be at least gradually opened, thereby monitoring an amount of vapor flow to the fuel cell or cells 1014. The same design and operation of the present illustrative examples of fuel cell assemblies 810 and 1030 may apply to fuel cell assemblies of other shapes.

The chamber 826, 926 and 1026 of the fuel cell assembly 810, 910 and 1030 may be sealed and fuel may added through an opening having a removable cover 1027 adjacent or part of the fuel chamber 1011, which seals chamber 1026 when the cover is in place.

The fuel cell 1014 may have an electrolytic membrane 1017 positioned between a negative electrode or cathode 16 and a positive electrode or anode 1018. A hydrogen fuel (i.e., hydrogen gas) may be channeled through flow field plates 1021 and 1022 to the anode 1018, while oxygen is channeled to the cathode 1016 of the fuel cell. At the anode 1018, the hydrogen may be split into positive hydrogen ions (protons) and negative electrons. The electrolytic membrane may allow only protons to pass through it to the cathode 1016. The electrons instead may travel as a current via an external circuit 1019 to the cathode 1016. At the cathode 1016, the electrons and the protons may combine with oxygen to form water molecules.

Once water is formed as a byproduct of an oxygen-hydrogen reaction at the fuel cell 1014, the produced water may passively diffuse back through the fuel cell into a cavity 1026 to the fuel chamber or container 1011. Within the cavity 1026 on the anode 1018 side of the fuel cell 1014, a relatively low humidity region may exist due to a moisture absorbing nature of the fuel substance in fuel container 1011. Thus, the water retention at the cathode 1016 may generate a moisture concentration gradient and a gas pressure differential which causes water molecules to diffuse back through the fuel cell 1014 into cavity 1026 and to fuel chamber 1012 in the form of water vapor. This water vapor may react with the fuel of container 1011 and generate hydrogen gas. The generated hydrogen gas may then pass through cavity 1026 and to the fuel cell anode 1018 where it can react with oxygen to once again generate water molecules. This cycle may continue until all of the fuel in chamber 1011 is consumed.

The fuel cell power generator system 1030 may utilize the valve 1012 for regulating the passage of water vapor from the fuel cell 1014 to the container 1011 and regulating the production of hydrogen gas from the fuel container 1011. Valve 1012 may be positioned in the cavity 1026 between the fuel container 1011 and the fuel cell 1014. Valve 1012 may be a pneumatic valve that is controlled by a gas pressure in the cavity 1026, where it is pneumatically adjusted to control a conveyance of water vapor to the fuel container 1011. Valve 1012 may be a slidable plate 1022 with openings adjacent to another plate 1021 having similar openings 1023 which overlap each other upon closing or opening the valve 1012, which is described at another place of this description. When the valve 1012 is in a closed position, it may prevent water vapor from reaching the fuel container 1011. Alternatively, when valve 1012 is in an open position, it may allow water vapor to reach the fuel container 1011 and allow generated hydrogen gas to reach the fuel cell 1014. The singular reference to a fuel cell 1014 in this description may also mean reference to more than one fuel cell.

The actuation of valve 1012 may be controlled by an internal pressure exerted on the diaphragm 1013. As the internal gas pressure of the cavity 1026 rises due to the generation of hydrogen gas, the diaphragm 1013 may bend or push out slightly. This may cause the linkage 1025 to pull slidable valve plate 1022 and move it relative to plate 1021, closing the valve 1012 and preventing the flow of additional water vapor to the fuel container 1011. With valve 1012 closed, the hydrogen production may cease. This situation may also prevent the internal gas pressure from rising further. As hydrogen is consumed, such as by fuel cell 1014, the internal gas pressure may drop, allowing the membrane 1013 to return to a more relaxed state and open the valve 1012. The sliding valve 1012 plate 1022 may move about one millimeter from fully open to fully closed. It may take about 4 psi (27 kPa) to 6 psi (42 kPa) pressure on the membrane or diaphragm 1013 to fully close the valve 1012. Accordingly, hydrogen gas may automatically be produced at a rate at which it is consumed.

Figure 11:
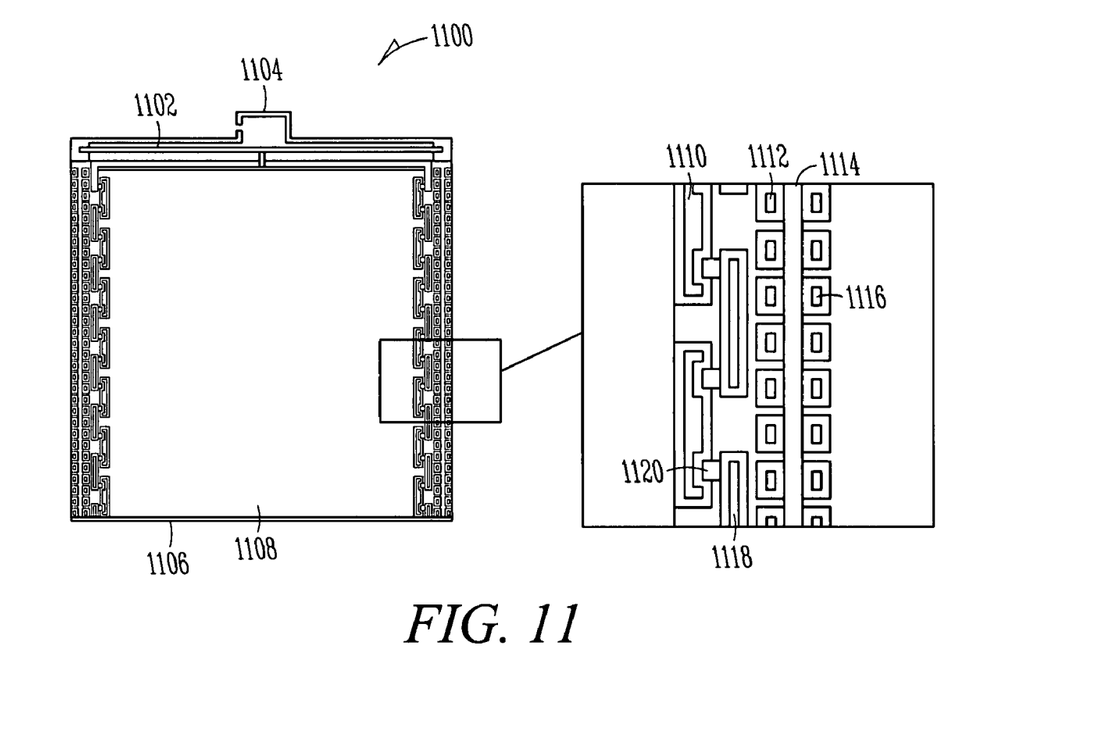
FIG. 11 illustrates a schematic of a fuel cell system utilizing an alkali metal silicide fuel, according to some embodiments.

FIG. 11 illustrates a schematic of a fuel cell system 1100 utilizing an alkali metal silicide fuel, according to some embodiments. An alkali metal silicide fuel 1108 may be enclosed with the system 1100 by fixed valve plates 1110 in contact with moveable valve plates 1118 (shown in expanded section). The moveable valve plates 1118 may be manipulated to allow for the release of the fuel 1108 to the anode layer 1112, fuel cell stack 1114 and cathode layer 1116. The moveable valve plates 1118 may also assist in water management within the system 1100. The fuel cell system 1100 further includes an anode output electrode 1106 and cathode output electrode 1104. A flexible diaphragm 1102 may be utilized to control the movement of the moveable valve plates

1118. The flexible diaphragm 1102 may respond to the internal gas pressure of the cavity in which the fuel 1108 is enclosed.

Figure 12:
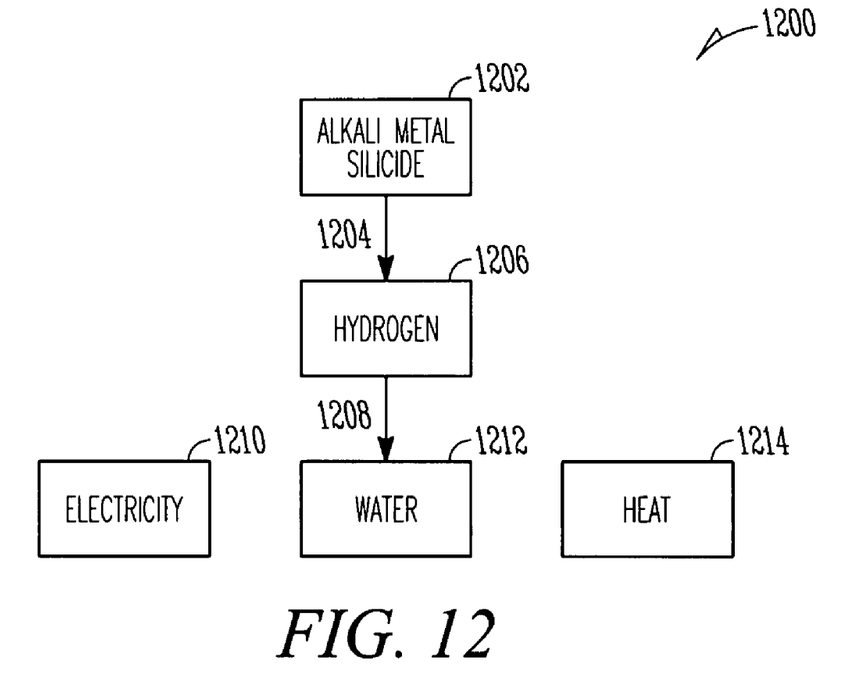
FIG. 12 illustrates a method of using a power generator, according to some embodiments.

FIG. 12 illustrates a method 1200 of using a power generator according to an example embodiment. An alkali metal silicide 1202 may be contacted or reacted 1204 with water or water vapor sufficient to produce hydrogen 1206. The hydrogen 1206 may then be contacted 1208 with one or more fuel cells in order to produce electricity 1210 and the by-products of water 1212 and heat 1214. The electricity 1210 produced may be stored or utilized by an external device. The by-products of water 1212 and heat 1214 may be discarded or reclaimed for further processes.

Figure 13:
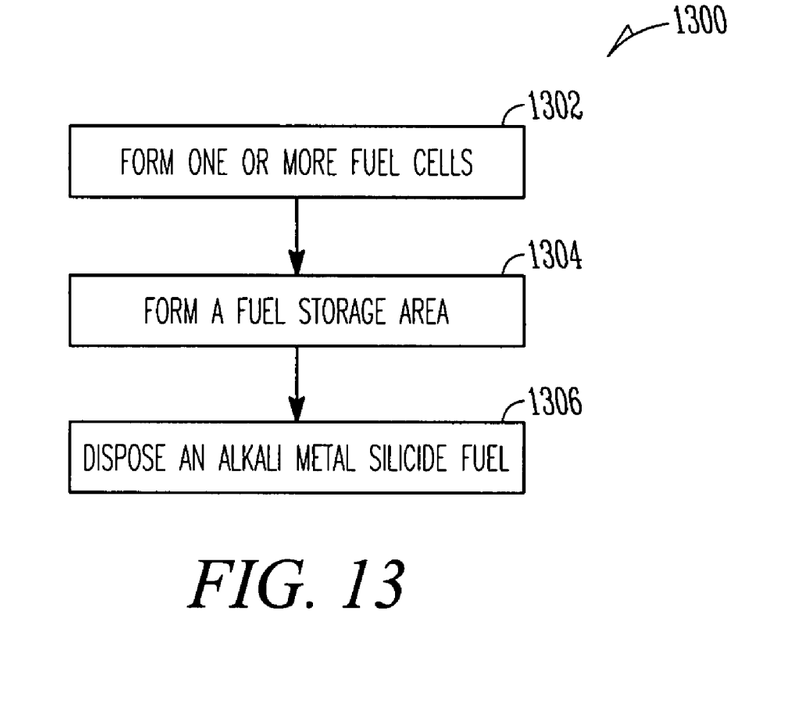
FIG. 13 illustrates a method of making a power generator, according to some embodiments.

FIG. 13 illustrates a method 1300 of making a power generator according to an example embodiment. One or more fuel cells may be formed 1302. A fuel storage area may be formed 1304 in contact with the one or more fuel cells. An alkali metal silicide fuel may be disposed within the fuel storage area 1306.

While the present invention has been particularly shown and described with reference to many embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A power generator, comprising:
   at least one fuel chamber within a housing;
   an air inlet, positioned in the housing;
   one or more fuel cells, mounted within the housing;
   a cavity, extending from the one or more fuel cells to the at lest one fuel chamber; and
   a porous membrane, permeable to at least water and hydrogen and positioned between the fuel chamber and the one or more fuel cells; and
   a fuel enclosed within the at least one fuel chamber, wherein the fuel comprises an alkali metal silicide.

2. The power generator of claim 1, wherein the alkali metal silicide comprises silicon and one or more alkali metals selected from the group of lithium, sodium, potassium, rubidium, cesium and francium.

3. The power generator of claim 1, wherein the alkali metal silicide comprises a compound of silicon and sodium.

4. The power generator of claim 1, wherein the alkali metal silicide comprises a sodium-potassium alloy and silicon.

5. The power generator of claim 1, wherein the alkali metal silicide comprises a powder.

6. The power generator of claim 1, wherein the alkali metal silicide comprises a gel.

7. The power generator of claim 1, further comprising one or more valves separating the fuel from the one or more fuel cells.

8. A hydrogen generator, comprising:
   a fuel chamber, enclosing an alkali metal silicide;
   a porous membrane forming at least a portion of the chamber wall;
   an air inlet, adapted to receive ambient air and positioned in the housing;
   one or more fuel cells, mounted within the housing; and
   a cavity, extending from the one or more fuel cells to the at lest one fuel chamber;
   wherein when the alkali metal silicide is contacted with water through the membrane, hydrogen is generated and flows through the cavity from the fuel chamber to the one or more fuel cells.

9. The fuel cell of claim 8, wherein the alkali metal silicide comprises silicon and one or more alkali metals selected from the group of lithium, sodium, potassium, rubidium, cesium and francium.

10. The fuel cell of claim 8, wherein the alkali metal silicide comprises a compound of silicon and sodium.

11. The fuel cell of claim 8, wherein the alkali metal silicide comprises a sodium-potassium alloy and silicon.

12. The fuel cell of claim 8, wherein the alkali metal silicide comprises a powder.

13. The fuel cell of claim 8, wherein the alkali metal silicide comprises a gel.

14. The fuel cell of claim 8, wherein the fuel further comprises hydrogen.

15. The hydrogen generator of claim 8, wherein the one or more fuel cells comprise proton exchange membrane (PEM) fuel cells.

* * * * *